United States Patent [19]

Yamaguchi et al.

[11] Patent Number: 4,639,400
[45] Date of Patent: Jan. 27, 1987

[54] CERAMIC SUBSTRATE OF NA2O AND NB2O5 FOR MAGNETIC METAL THIN FILM

[75] Inventors: Takashi Yamaguchi, Tokyo; Naomi Nagasawa; Hidemasa Tamura, both of Kanagawa, all of Japan

[73] Assignee: Sony Corporation, Tokyo, Japan

[21] Appl. No.: 786,464

[22] Filed: Oct. 10, 1985

[30] Foreign Application Priority Data

Oct. 12, 1984 [JP] Japan ................................ 59-213594

[51] Int. Cl.$^4$ .......................... B32B 9/00; B32B 18/00
[52] U.S. Cl. .................................... 428/694; 428/132; 428/689; 428/702; 428/900; 501/134
[58] Field of Search ................ 501/134; 428/694, 702, 428/900, 433, 689, 132; 360/126, 127

[56] References Cited

U.S. PATENT DOCUMENTS

| | | | |
|---|---|---|---|
| 3,391,542 | 7/1968 | Herrick et al. | 405/264 |
| 3,495,412 | 2/1970 | Sakata et al. | 405/264 |
| 3,611,733 | 10/1971 | Eilers et al. | 405/264 |

FOREIGN PATENT DOCUMENTS

| | | | |
|---|---|---|---|
| 46-04786 | 2/1971 | Japan | 405/264 |
| 50-31725 | 10/1975 | Japan | 405/264 |
| 3027304 | 1/1983 | Japan | 405/264 |

OTHER PUBLICATIONS

Shafer et al, "Phase Equilibria in the System Na2O.Nb2O5," Journal of the American Ceramic Society (1959) vol. 42, No. 10, pp. 482–486.

Primary Examiner—Helen M. McCarthy
Attorney, Agent, or Firm—Hill, Van Santen, Steadman & Simpson

[57] ABSTRACT

A ceramic composition particularly useful for use in thin film magnetic heads, the composition having the general formula:

$$xNaO \cdot yNb_2O_5$$

wherein the ratio x/y is at least 0.74 but less than 1.00, the composition having a coefficient of thermal expansion closely matching that of the magnetic alloy film with which it is used so as to prevent separation of the two upon changes in temperature.

3 Claims, 3 Drawing Figures

[4,639,400]

CERAMIC SUBSTRATE OF NA₂O AND NB₂O₅ FOR MAGNETIC METAL THIN FILM

BACKGROUND OF THE INVENTION

1. Field of the Invention

The present invention is in the field of ceramic compositions used as a substrate for a thin metal film, the ceramic compositions having improved coefficients of thermal linear expansion which provides a minimum risk of detachment between the two.

2. Description of the Prior Art

In the field of magnetic recording, the tendency is toward higher density recording, and using higher frequency signals for recording. To achieve higher density recording, use has been made of metal powder tapes containing powders of ferromagnetic metals such as iron, cobalt, and nickel or so-called evaporated tapes which include ferromagnetic metal materials deposited by evaporation on a base film. To make use of such magnetic materials, the magnetic head used must have a high magnetic saturation flux density Bs.

In the new high density recording methods, the track width of the magnetic recording becomes very small. Accordingly, there is a corresponding need for an extremely narrow track width on the magnetic head.

The newer magnetic heads may be of the composite type wherein a non-magnetic substrate and a magnetic metal thin film to be used as the magnetic core are stacked one on the other and the magnetic thin film is used as the track. Another form of magnetic recording-reproducing head consists of one in which the thin film of magnetic metal and the conductive metal thin film are stacked on a non-magnetic base with intermediate insulating thin film layers. The usage of metal thin films is thus increasing rapidly in the field of magnetic recording.

When a metal thin film is used in a magnetic head, a ceramic base is usually employed as a substrate. The conventional ceramic substrate has a disadvantage in that it has a thermal expansion coefficient markedly lower than that of the metal itself and hence the metal film tends to be detached from the ceramic base during exposure to higher temperatures. For example, the coefficient of linear expansion α of "Permalloy" or "Sendust" used in thin film magnetic heads amounts to about 130 to $160 \times 10^{-7}/°$ C., whereas those of commercially used barium titanate and calcium titanate ceramics are considerably lower, amounting to about 90 to $100 \times 10^{-7}/°$ C. and 100 to $120 \times 10^{-7}/°$ C., respectively.

Thus, there is a need for a ceramic base having a linear thermal expansion coefficient which is comparable to that of the aforementioned metal thin films.

SUMMARY OF THE INVENTION

In accordance with the present invention, we provide a novel ceramic composition having a linear thermal expansion coefficient which is very comparable to that of the magnetic thin film with which it is used. As a result of our research, the present inventors have found that the linear expansion coefficient of a ceramic composition can be controlled by controlling the relative percentage of the components in the two component ceramic composition of the Na₂O-Nb₂O₅ series. The present invention provides a ceramic composition represented by the formula $xNa_2O \cdot yNb_2O_5$ wherein the ratio x/y is at least 0.74 but is less than 1.00.

It has been found that the ceramic compositions of the Na₂O-Nb₂O₅ series of the type described exhibit thermal expansion coefficients in the range from 130 to $160 \times 10^{-7}/°$ C., that is, they are approximately equal to those of the metallic thin films. Hence, when the ceramic composition of the present invention is used in the magnetic head, the head is highly reliable in operation with a minimum risk of detachment or exfoliation between the metal thin film and the nonmagnetic substrate.

BRIEF DESCRIPTION OF THE DRAWINGS

A further explanation of the present invention will be made in conjunction with the attached sheets of drawings in which.

DESCRIPTION OF THE PREFERRED EMBODIMENTS

The ceramic composition of the present invention represented by the general formula $xNa_2O \cdot yNb_2O_5$ has a critical component ratio to achieve the required results. With the ratio x/y less than 0.74, the linear thermal expansion coefficient α is less than $130 \times 10^{-7}/°$ C. which is too small compared to that of the metal thin film. With x/y equal to or in excess of 1.00, the composition is incapable of being sintered so that it is not possible to obtain a high quality ceramic composition.

When the component ratio or percentage of the ceramic composition is such that the ratio x/y is equal to or greater than 0.74 but less than 1.00, the linear expansion coefficient falls within the range of 130 to $160 \times 10^{-7}/°$ C., making it ideal for use in conjunction with thin film magnetic metals.

The present invention will be explained with reference to a specific example. It should be noted, however, that the example is given only as an illustration and should not be construed as limiting the scope of the invention.

EXAMPLE

Powders of Na₂CO₃ and Nb₂O₅ each with a purity of greater than 99.9% were prepared. These powders were weighed out to give the desired composition, and the weighed powders were ball milled using ethanol as the mixing medium. The resulting mixture was heated to remove the ethanol.

The mixture was molded under pressure of 500 kg/cm² and the molded product was calcined in air at 900° C. for 3 hours. The baked product was crushed in a mortar, again ball milled with ethanol as a mixing medium, and heated to remove the ethanol. The resulting product was molded under a pressure of 1500 kg/cm² and fired in air at 1200° C. for 3 hours to produce a ceramic composition.

Various samples of the ceramic composition were prepared in this manner by using different percentages of the $Na_2CO_3$ and $Nb_2O_5$ components. These samples were shaped into prisms and the linear thermal expansion coefficient of each was measured by means of a linear dilatometer for the temperature range of 40° to 600° C.

Figure 1:
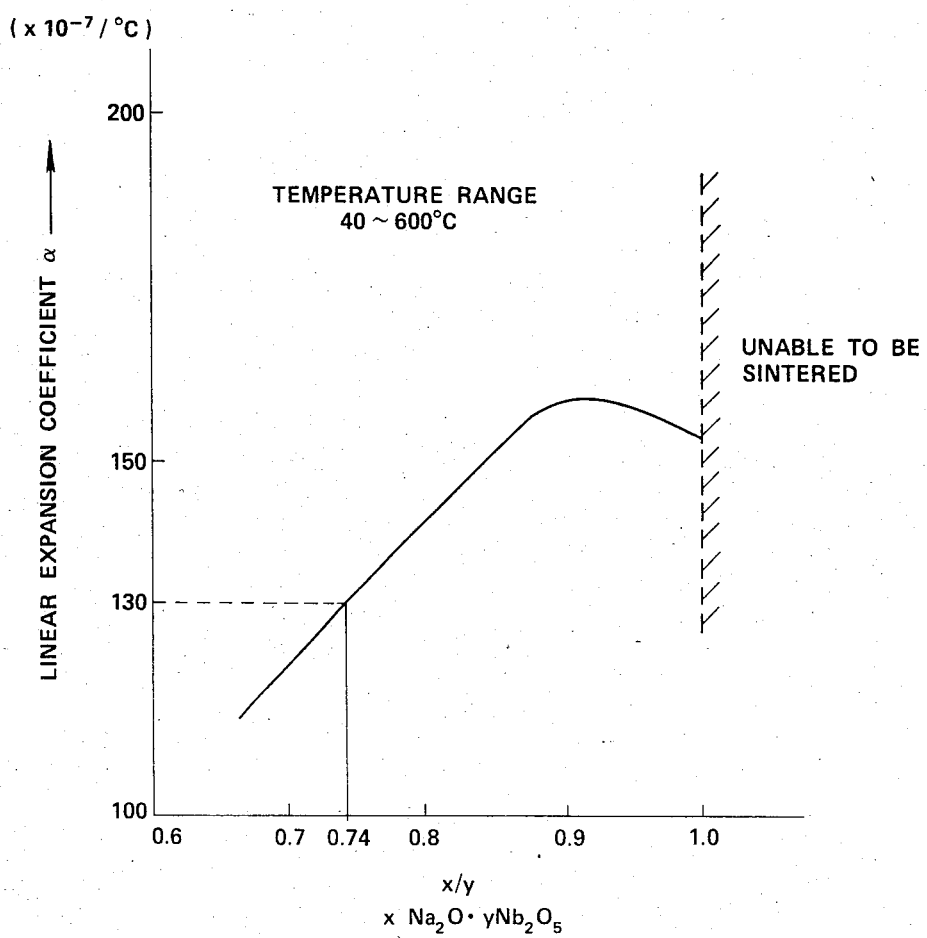
FIG. 1 is a graph showing the relationship between the linear expansion coefficient α, and the ratio x/y for the ceramic composition represented by the formula $xNa_2O \cdot yNb_2O_5$.

The results are plotted in FIG. 1 wherein the coefficient $\alpha$ is plotted against the ratio x/y for the ceramic composition represented by the formula $xNa_2O \cdot yNb_2O_5$. In FIG. 1, the samples in which the ratio x/y was greater than 1 were excluded because a ceramic composition of the desired quality could not be obtained for that ratio range.

It will be seen from FIG. 1 that the coefficient $\alpha$ of the ceramic composition increases with increase in the $Na_2O$ ratio and that with the ratio x/y greater than 0.74, the coefficient $\alpha$ is 130 to $160 \times 10^{-7}/°$ C., or approximately equal to the coefficient of the metal film. The particularly preferred range is one in which the ratio x/y extends from 0.85 to 0.95 and the ceramic has a coefficient of thermal expansion from 150 to $160 \times 10^{-7}/°$ C.

The present invention will be further explained by reference to an application example wherein the ceramic composition of the present invention is applied to a magnetic head.

APPLICATION EXAMPLE 1

Figure 2:
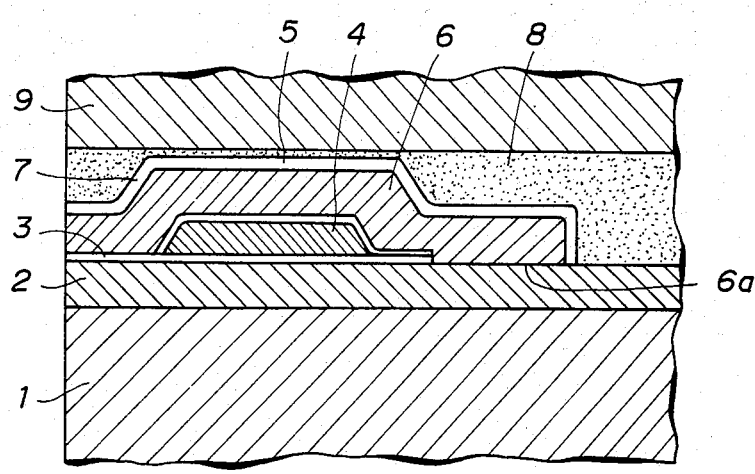
FIG. 2 is a fragmentary sectional view of a thin film type magnetic head wherein the ceramic composition of the present invention is used as a nonmagnetic substrate.

FIG. 2 shows an example of a thin film magnetic head wherein the ceramic composition of the present invention is used as a nonmagnetic base. In the example illustrated, the improved ceramic material is used as a nonmagnetic base 1 and a lower magnetic film 2 such as a film of "Sendust" (Fe-Al-Si alloys) is deposited on the base 1 for providing the magnetic path.

On the lower magnetic film 2, there is deposited a signal conductor 4 utilizing an intermediate insulating layer 3 such as an $SiO_2$ layer. The signal conductor 4 may be formed by etching a copper thin film which has been deposited by sputtering. The conductor 4 is arranged for providing the recording and/or playback signals to the closed magnetic circuit including a lower magnetic film 2 or an upper magnetic film 6.

On the signal conductor 4 there is formed the upper magnetic film 6 composed of material such as "Sendust" through an intermediate second insulating layer 5. The rear portion 6a of the upper magnetic film 6 is connected to the lower magnetic film 2 for providing the back gap, whereas the foremost part of the film 6 is facing the lower magnetic film 2 and forms with the lower magnetic film 2 an operating gap for the magnetic recording. The thin film type magnetic head constructed in this manner is coated by means of a protective film 7 such as $SiO_2$ and a nonmagnetic protective plate 9 is bonded to the head by means of a solidified glass layer 8. The protective plate 9 is formed of the ceramic composition prepared as in the preceding Example, and is the same material that constitutes the nonmagnetic substrate 1.

In the thin film type magnetic head of the present invention since the thermal expansion coefficient of the nonmagnetic substrate 1 is about equal to that of the lower magnetic film 2, the film 2 does not tend to become detached even during heat treatment for increasing the magnetic properties of the metal thin film or upon heat treatment employed during the manufacturing process in processes such as glass melting or bonding.

APPLICATION EXAMPLE 2

Figure 3:
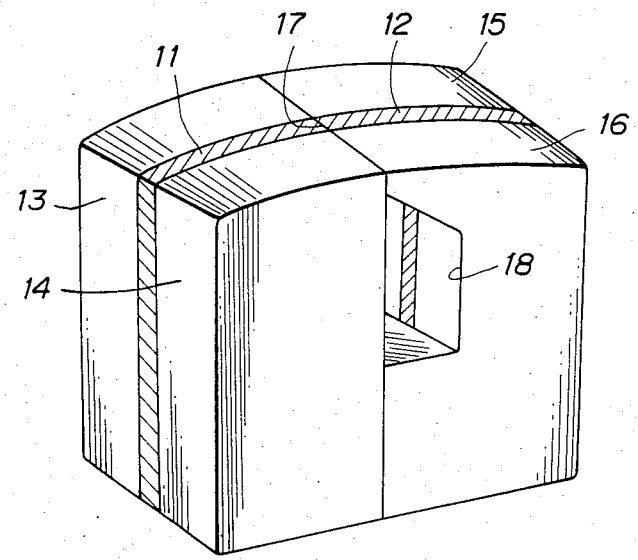
FIG. 3 is a view in perspective showing an example of the composite type magnetic head in which the ceramic composition of the present invention is used as a nonmagnetic substrate.

Another example in which the ceramic composition of the present invention is applied to a magnetic head is illustrated in FIG. 3. This magnetic head is constructed so that magnetic metal layers 11, 12 are positioned between nonmagnetic guard plates 13, 14, 15 and 16 and an operating gap 17 is provided by the abutment plane of the magnetic metal layers 11, 12 with the track width equal to the thickness of the magnetic metal layers 11, 12.

A winding slot 18 is provided in the magnetic head and a coil (not shown) is placed within the slot 18 for providing the recording and playback signals to the magnetic metal layers 11, 12.

The magnetic metal layers 11, 12 are provided as a lamination of a magnetic metal layer, for example, a thin ribbon of Sendust alloy or amorphous magnetic materials commonly used with this type of magnetic head, or by sputtering or evaporating a ferromagnetic metal material.

The nonmagnetic guard plates 13, 14 are formed of the ceramic composition of the present invention having a linear expansion coefficient $\alpha$ about equal to that of the magnetic metal layers 11, 12, so that there is no risk of detachment of the metal layers as a result of differential thermal expansion between the two as previously noted in connection with Application Example 1.

It should be evident that various modifications can be made to the described embodiments without departing from the scope of the present invention.

We claim as our invention:

1. A thin film magnetic head having a base and a magnetic alloy film deposited thereon, said base being composed of a ceramic composition having the general formula:

$xNa_2O \cdot yNb_2O_5$ wherein the ratio x/y is at least 0.74 but less than 1.00, said ceramic composition having a coefficient of thermal expansion of at least $130 \times 10^{-7}/°$ C.

2. A thin film magnetic head according to claim 1 wherein said magnetic alloy is an Fe-Al-Si alloy and said ceramic composition has the coefficient of thermal expansion in the range from 130 to $160 \times 10^{-7}/°$ C.

3. A thin film magnetic head according to claim 2 wherein the ratio x/y is in the range from 0.85 to 0.95 and said ceramic composition has a coefficient of thermal expansion of from 150 to $160 \times 10^{-7}/°$ C.

* * * * *